(12) United States Patent
Boyce et al.

(10) Patent No.: US 6,997,379 B2
(45) Date of Patent: Feb. 14, 2006

(54) METHOD FOR PERFORMING IDENTITY CARD PROVISIONING FOR MOBILE COMMUNICATION DEVICE ORDER FULFILLMENT

(75) Inventors: Michael A. Boyce, Coral Springs, FL (US); John M. Bragansa, Hollywood, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/410,421

(22) Filed: Apr. 9, 2003

(65) Prior Publication Data

US 2004/0200895 A1    Oct. 14, 2004

(51) Int. Cl.
G06K 5/00 (2006.01)
H04M 3/00 (2006.01)

(52) U.S. Cl. ....................... 235/380; 455/419
(58) Field of Classification Search ................. 235/375, 235/380; 455/411, 558, 418–420; 705/1, 705/22, 28, 500
See application file for complete search history.

(56) References Cited

U.S. PATENT DOCUMENTS

| | | | |
|---|---|---|---|
| 5,175,424 A | 12/1992 | Lisimaque | |
| 5,296,687 A | 3/1994 | Geronimi | |
| 5,471,045 A | 11/1995 | Geronimi | |
| 5,481,600 A * | 1/1996 | Alesio | 379/114.15 |
| 5,485,505 A * | 1/1996 | Norman et al. | 455/419 |
| 5,877,975 A | 3/1999 | Jigour et al. | |
| 5,887,253 A | 3/1999 | O'Neil et al. | |
| 6,029,143 A | 2/2000 | Mosher et al. | |
| 6,175,517 B1 | 1/2001 | Jigour et al. | |
| 6,199,161 B1 | 3/2001 | Ahvenainen | |
| 6,278,885 B1 * | 8/2001 | Hubbe et al. | 455/558 |
| 6,308,069 B1 | 10/2001 | Freitag et al. | |
| 6,393,408 B1 | 5/2002 | Mosher et al. | |
| 6,445,914 B1 * | 9/2002 | Findikli et al. | 455/411 |
| 6,480,724 B1 * | 11/2002 | Erkkila et al. | 455/557 |
| 6,513,719 B1 | 2/2003 | Imura | |
| 6,591,098 B1 * | 7/2003 | Shieh et al. | 455/419 |

* cited by examiner

Primary Examiner—Karl D. Frech
Assistant Examiner—Jamara A. Franklin
(74) Attorney, Agent, or Firm—Scott M. Garrett

(57) ABSTRACT

An order is generated by a wireless communication service provider, or an agent of the wireless communication service provider. The order is for a new account, and includes information about the customer as well as provisioning information. The order is transmitted electronically to an order fulfillment center. The order fulfillment center assembles a kit for shipment to the customer, and includes a mobile communication device using an identity card. The identity card is programmed with the provisioning information at the order fulfillment center, and the kit is then shipped to the customer.

9 Claims, 3 Drawing Sheets

METHOD FOR PERFORMING IDENTITY CARD PROVISIONING FOR MOBILE COMMUNICATION DEVICE ORDER FULFILLMENT

TECHNICAL FIELD

This invention relates in general to order fulfillment systems in the manufacture of mobile communication devices, and more particularly to provisioning identity cards in the process of order fulfillment.

BACKGROUND

Mobile communication devices such as cellular telephones are in widespread use throughout the world, and particularly in metropolitan areas. In many of these regions mobile communication is now seen as virtually essential to every day life, and many users have used a number of different mobile communication devices over the past few years as technology changes to take advantage of new features found on newer models. The market in these regions has shifted from merely providing access to communication service to providing service enhancing features such as messaging, voice recognition, speaker phone, and so on. As new technologies emerge, users are inclined to buy new mobile communication devices that provide these new features. When a user decides to use a newer mobile communication device, the user would have to inform the communication service provider of the unique identifier associated with the mobile communication device, such as an international mobile equipment identifier, or IMEI. Furthermore, if the user has any calling numbers or other information stored in the old mobile communication device, it must be re-entered manually in the new mobile communication device.

To solve the problem of users having to re-enter information, and service providers having to re-provision service for a user's new mobile communication device, manufacturers of mobile communication devices began using small cards that have memory on board, and are used to store identity parameters and other information such as contact information and calling numbers. An example of such an identity card is the widely used subscriber identity module, or SIM card used in systems operated in accordance with the Global System for Mobile communication (GSM) standard, as well as in mobile communication devices sold under the tradename iDEN, manufactured by Motorola, Inc. These cards are standardized so as to be interchangeable among mobile communication devices that conform to the standard.

As mentioned, the identity card is used to store, among other items of information, identity parameters. The identity parameters are transmitted upon powering up the mobile communication device to register for communication service. The identity parameters are received by the communication system infrastructure equipment, and are used to verify the user is allowed to access communication resources, and makes communications resources available upon verification. The use of an identity card permits the user to remove the card and place it into another mobile communication device that accepts such cards, thereby allowing the user to use any such card-accepting mobile communication device, and to bring along vital information such as calling numbers. When a user purchases a new mobile communication device, it is a simple task to remove the card form the old mobile communication device and place it into the new mobile communication device. Upon powering up the new mobile communication device, the new mobile communication device transmits the identity parameters to the communication service infrastructure which in turns registers the mobile communication device for service. The change in the actual mobile communication device can be transparent to the communication system.

Once a user has an identity card for use with an mobile communication device, the user can change to a new mobile communication device. The process of how a user acquires a first identity card will now be examined.

Typically a user receives an identity card with the first mobile communication device they purchase that uses an identity card. The card is supplied by the communication service operator, along with the mobile communication device, which is also typically purchased from the communication system operator. The card itself is manufactured by a card manufacturer, and is provided to either the communication system operator, or the mobile communication device manufacturer, and is preprogrammed with the identity parameters by the card manufacturer. When a user buys a mobile communication device and the identity card, the communication service provider must record the identity parameters and associate them with the user's record in the communication system.

One arrangement for selling mobile communication devices is for a manufacturer to manufacture, sell, and ship mobile communication devices to a communication system operator, who then ships the mobile communication devices to selling agents. These agents sell to the end customers, and collect customer information that is transmitted to the communication system operator so that the communication system operator can create an account for the customer and provide communication service to the customer. The information includes the necessary identity information of the particular mobile communication device sold to the customer, such as, for example, an IMEI number. This method, however, is not favored because it requires the selling agents and communication service providers to carry an inventory.

An alternative method of distributing mobile communication devices is described in U.S. Pat. Nos. 6,029,143 and 6,393,408, both of which are entitled "Wireless Communication Product Fulfillment System," and commonly assigned to Brightpoint, Inc. In both of these patents a system of order fulfillment for wireless or mobile communication devices is described. A fulfillment center receives orders from ordering agents which generate orders in response to sales transactions. The fulfillment center also receives components and holds them in a component inventory until they are to be assembled with a mobile communication device in a kit. Once an order arrives, kits are assembled to fill the order. In this model SIM cards are treated as components. Orders arrive at the fulfillment center for kits, and specify the identifier to be used for each particular phone in each kit that is assembled at the fulfillment center. Since SIM cards are conventionally manufactured with the identifier number, the fulfillment center must keep track of which SIM card goes with a particular kit. The communication service providers are assigned a block of identifiers, and as new orders are taken, the identifiers are taken from the list and entered into the order. The order is then transferred to the fulfillment center which locates the SIM with the corresponding identifier and assembles it into the kit, which may include installing the SIM into the phone.

U.S. Pat. No. 5,887,253 to O'Neil et al, and assigned to BellSouth Corp., describes an alternative method of providing method of providing SIM cards for order fulfillment. A cellular service provider takes orders for new subscribers, assigns an international mobile subscriber identifier (IMSI)

to the order. The IMSI is then sent to a SIM manufacturer which manufactures a SIM, programs the IMSI and a SIM number into the SIM, and then ships the SIM to a distribution center where the SIM is matched to a kit including a phone having an IMEI number. The distribution center ships the kit to a customer, and transfers the SIM and IMEI information to the cellular service provider. This method also requires the order fulfillment center to match a specific SIM with a particular order.

Therefore there is a need for a method of mobile communication device order fulfillment that obviates the need to match a particular identity card with a specific mobile communication device.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
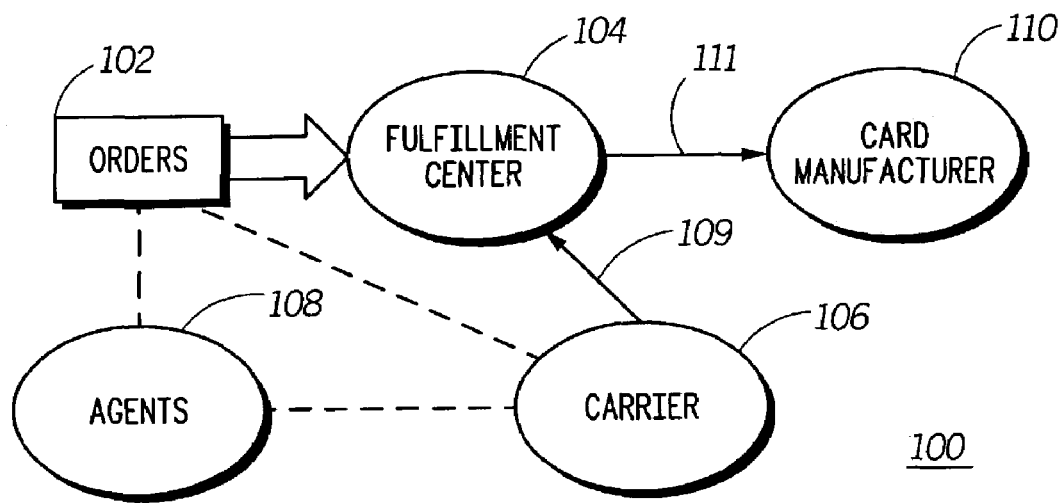
FIG. 1 shows a schematic diagram of an order fulfillment system for mobile communication devices receiving orders.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a schematic flow diagram 100 of an order fulfillment system for mobile communication devices receiving orders 102. Orders are sent to the fulfillment center 104 from both carriers 106 and agents 108. The fulfillment center orders (111) identity cards, such as SIM cards, from a card manufacturer 110.

The carrier 106 is a mobile wireless communication system operator that provides mobile wireless communication service in a serving area, as is known in the art. The carrier 106 typically operates a fixed equipment network that includes base station equipment for establishing serving cells, and switching equipment for establishing voice circuits between serving cells and between serving cells and a public switched telephone network. The fixed equipment network may also include packet data switching equipment for providing wireless packet data service to mobile subscribers. Mobile subscribers use mobile communication devices to access the communication resources of the carrier's communication system for making phone calls and other types of calls, as is well practiced.

In order for a subscriber to access the communication resources provided by the carrier, the subscriber must have an account provisioned by the carrier. Otherwise, attempts to access communication resources will be denied by the carrier. In provisioning an account for a particular subscriber, the carrier records the unique registration identifier and other authentication information stored in the user's mobile communication device. The subscriber's provisioning information is stored in a database, such as a home location register, for use in registering and authenticating the subscriber's mobile communication device for communication service.

Typically the carrier records an international subscriber identifier (IMSI), or other identifier such as a SIM number, and a Ki authentication key. In many mobile communication devices a removable identity card is used to store the provisioning information. The mobile communication device may have a international mobile equipment identifier (IMEI) in addition to the IMSI or other identifier. The IMEI is stored in the mobile communication device, preferably in a read only memory of the mobile communication device. The IMEI can be used by the carrier to determine what services and applications the customer's mobile communication device can support. In the preferred embodiment the identity card is a subscriber identity module (SIM) card that is manufactured in accordance with well recognized standards, except as otherwise indicated herein. Therefore, in order for a subscriber to access communication resources, the user's mobile communication device must have an identity card, or equivalent, containing provisioning information recognized by the carrier's communication system. In many cases a subscriber receives an identity card when ordering a mobile communication device for use with the carrier's communication system.

Subscribers typically obtain a mobile communication device by ordering or purchasing one from a carrier 106, or a carrier agent 108. In the preferred embodiment, the subscriber places an order for both a mobile communication device and an associated identity card when setting up an account with the carrier for communication service. Agents are third parties that market subscriber communication equipment and service, and take orders for new accounts on behalf of a carrier or carriers. Quite often agents operate a sales and ordering business in public places such as shopping centers.

The entity generating the order takes down subscriber information such as name, billing address, and so on. In addition to personal information, provisioning information and an order number are assigned to the order. The provisioning information includes an identifier to be used by, and associated with a mobile communication device. In the preferred embodiment, the identifier is a SIM number selected from a pool of SIM numbers assigned to the carrier. An agent may communicate with the carrier electronically to request or reserve a SIM number from the carrier's pool of SIM numbers. At the same time, the agent transmits the personal information to the carrier so that the carrier may set up a subscriber record and associate the provisioning information with the record, including a mobile calling number so that others may call the subscriber's mobile communication device. The transmission of data is preferably a preformed in a secure communication mode, such as electronic data interchange (EDI). Therefore, according to the invention, agents 108 and carriers 106 generate orders 102 which are transmitted to the order fulfillment center 104. The carrier transmits provisioning information (109) to be used in filling the order to the order.

The fulfillment center, in order to fill orders and in anticipation of receiving orders, places (111) an order for identity cards with the card manufacturer 110. Ordinarily the manufacture and distribution of identity cards is carefully controlled by the card manufacturer, and a unique identifier is typically programmed into the card before it is shipped from the premises of the card manufacturer. A security mechanism on the card prevents unauthorized parties from programming certain portions of the card memory. The care taken to ensure each card is programmed with a unique identifier is to prevent the card from being used to impersonate another card. However, according to the invention, the card manufacturer does not program the cards ordered by the fulfillment center.

Therefore, once the actions described in reference to FIG. 1 have been taken, an order or orders have been generated by the carrier or carrier agents or both, and the orders have been transmitted to the fulfillment center along with provisioning information associated with each particular order. The fulfillment center, in order to fill the orders, has ordered unprogrammed identity cards from the card manufacturer.

Figure 2:
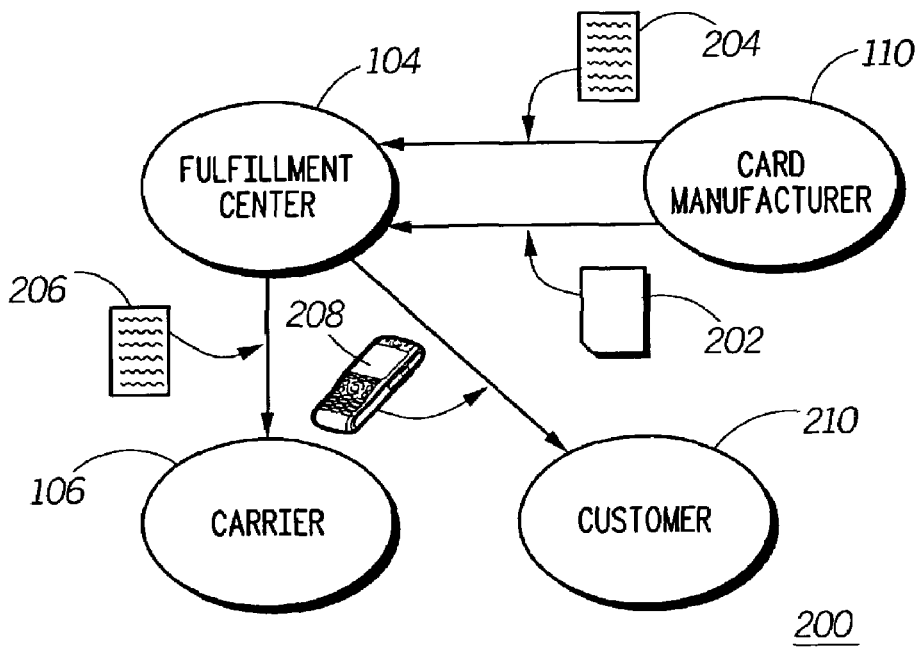
FIG. 2 shows a schematic diagram of an order fulfillment system for mobile communication devices processing orders.

Referring now to FIG. 2, there is shown a schematic diagram 200 of an order fulfillment system for mobile communication devices processing orders. In response to the fulfillment center ordering identity cards, the card manufacturer ships cards 202 to the fulfillment center 104. However, to ensure the cards are not accessible by unauthorized parties, the identity cards have a security mechanism that requires a code to be provided before it can be programmed. Each card has a security identifier, and the corresponding security codes 204 are transmitted electronically to the fulfillment center 104 via a secure communication means, such as EDI. The identity cards are installed into mobile communication devices at the fulfillment center in a kit to fill an order. The cards are programmed with provisioning information, including the assigned registration identifier such as an IMSI or SIM number. Once the kit is assembled with the programmed identity card, the fulfillment center sends confirmation information 206 to the carrier, and ships the mobile communication device 208 to the customer 210. The confirmation information includes the provisioning information and preferably additional information such as the IMEI of the mobile communication device shipped to the customer. Thus, when the mobile communication device arrives at the customer's premises, it can be immediately used for communicating. It should be noted that the cards 202 may be partially programmed with information required to be present for all users of the service provided by the carrier, and only the provisioning information then needs to be programmed into each card. The preprogrammed information would include network parameters such as, for example, country code, network codes, and so on. Alternatively, these parameters can be left blank and programmed at the same time the provisioning information is programmed. The latter alternative would be of benefit in the case where the order fulfillment center is fulfilling orders for multiple carriers, each with it's own unique network parameters. Since these network parameters would be the same for each customer of a given carrier, they can be stored locally at the order fulfillment center, and do not need to be transmitted with each order.

Figure 3:
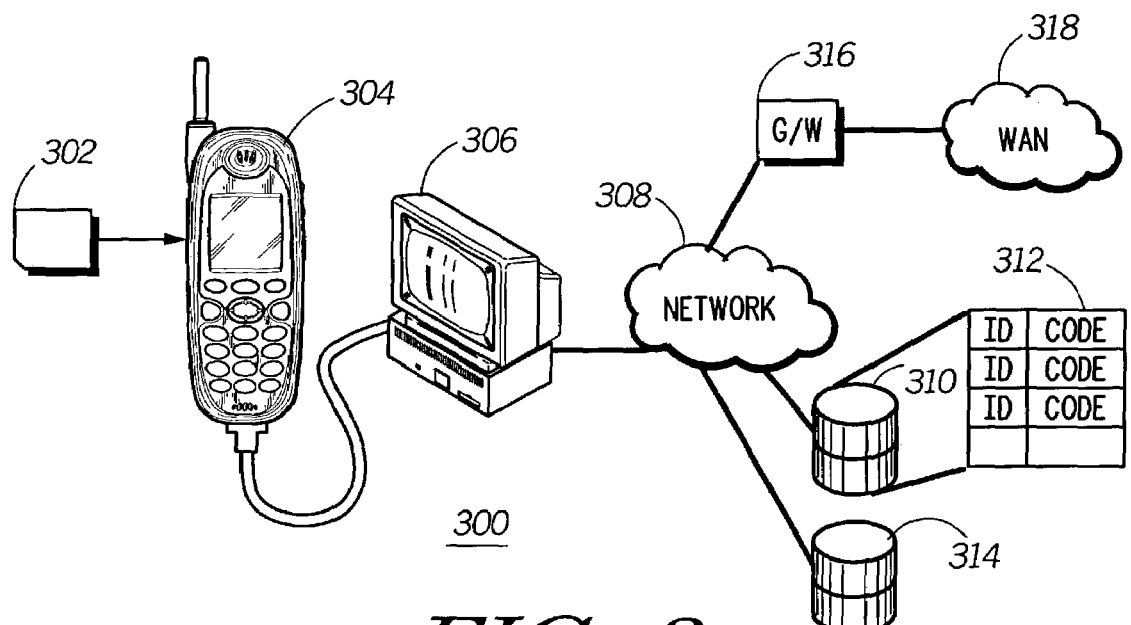
FIG. 3 shows a block diagram of a system for programming SIM cards in a mobile communication device, in accordance with the invention.

Referring now to FIG. 3, there is shown a schematic chart diagram 300 of a system for programming identity cards at a fulfillment center, in accordance with the invention. An identity card 302, such as a SIM card is programmed at the fulfillment center. There are a variety of way the card may be programmed, but in the preferred embodiment the card is installed into a mobile communication device 304 where it will be used. It is contemplated that the cards may be programmed in a card programming fixture or equivalent, outside the mobile communication device. The mobile communication device has a connector for connecting to a local computer or programming station 306. Typically the local computer is connected to a network 308 at the fulfillment center, to which are connected a first database 310 for storing security code records 312, a second database 314 for storing order information, and a gateway 316 for connecting the network to a wide area network 318.

Figure 4:
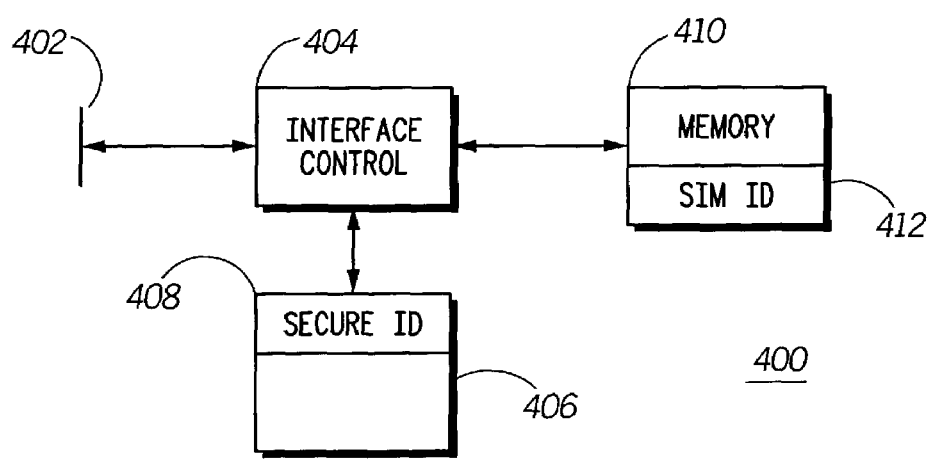
FIG. 4 shows a schematic block diagram of SIM.

FIG. 4 shows a schematic block diagram 400 of an identity card for use with the invention. The identity card has an interface 402 which provides connectivity to the card The interface is controlled by an interface controller 404 which controls access to the card memory. The interface controller may be, for example, a microprocessor. To prevent unauthorized access to the card, the card has a secure memory 406, which may be a read only memory. In the secure memory is a security identifier 408. The card also has a general memory 410, in which there may be a reserved memory 412 for storing provisioning information such as a SIM number. In order to access the reserved memory, a security code must be presented to the interface controller 404, and then the interface controller will permit the reserved memory to be programmed. There are various methods of performing substantially what is described in reference to FIG. 4. One such example is shown in U.S. Pat. No. 5,175,424 to Lisimaque and assigned to Gemplus Card International. A second exemplary method of card access control is shown in U.S. Pat. No. 5,296,687 to Geronimi, also assigned to Gemplus Card International.

According to the invention, the card is not programmed with provisioning information upon arrival at the fulfillment center, meaning the provisioning fields are blank or empty when they arrive. In filling an order, the card must be programmed with a registration identifier, such as a SIM number or IMSI. The fulfillment center, in addition to receiving unprogrammed identity cards form the card manufacturer, receives a file of security identifiers and corresponding security codes 312, which are stored on the first database 310. To program the card with the provisioning information, the local computer requests the security identifier from the interface or card controller 404. In the preferred embodiment, this is done through a connector disposed on the phone with the card installed in the phone. A processor in the phone may act as an interface between the card controller 404 and the local computer 306. The card controller fetches the security identifier and passes it to the local computer. The local computer looks up the security identifier in the first database and finds the corresponding security code, which is passed to the card controller. The card controller then permits programming of the provisioning information, including the registration identifier and authentication key. Once the card is programmed, the fulfillment center can notify the carrier via the gateway 316 over the wide area network 318, and include whatever information is needed to update the status of the order with the carrier.

Figure 5:
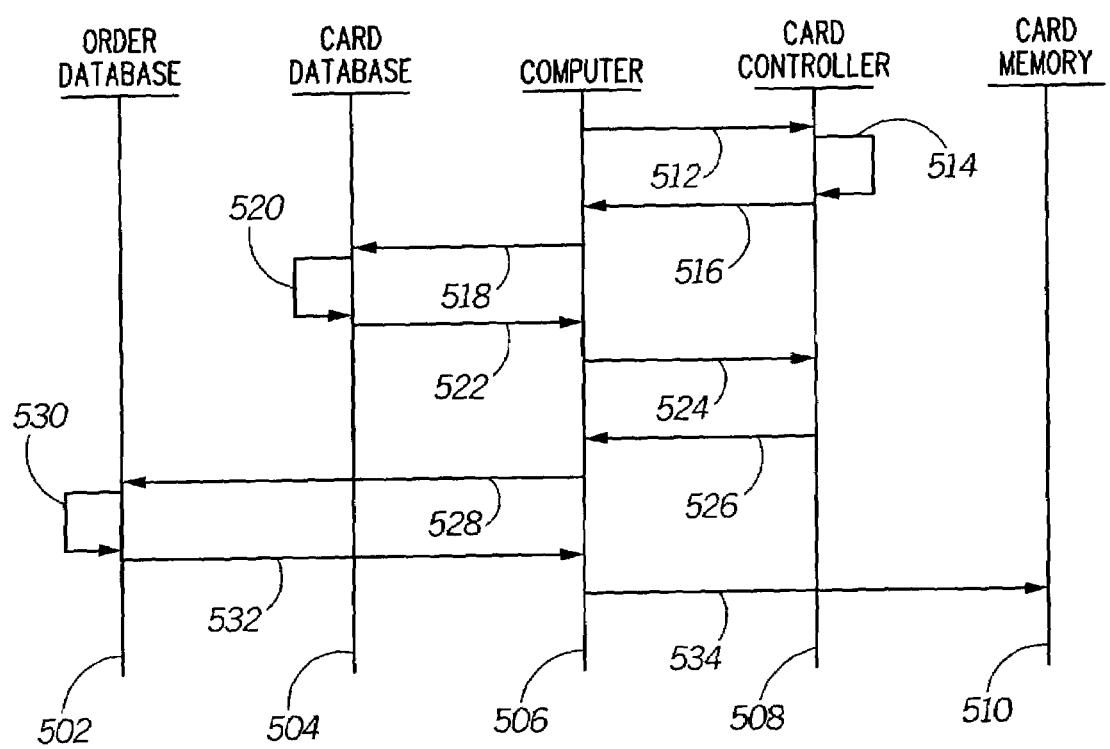
FIG. 5 shows a flow diagram of method for provisioning a SIM in a wireless communication device.

Referring now to FIG. 5, there is shown a signal flow diagram 500 of a method of provisioning an identity card, in accordance with the invention. In this example, the order database 502 corresponds to the second database 314 of FIG. 3; the card database 504 corresponds to the first database 310 of FIG. 3, the computer 506 corresponds to local computer or programming station 306 of FIG. 3; the card controller 508 corresponds to interface controller 404 of FIG. 4, and the card memory 510 corresponds to the reserved memory 412 of FIG. 4.

In commencing with programming the provisioning information into the card, the process begins with the computer requesting 512 the security identifier of the card. The card controller responds by fetching 514 the security identifier and sending 516 it to the computer. The computer then queries 518 the card database for the record corresponding to the security identifier, which locates 520 the file and returns 522 the corresponding security code. The computer then transmits 524 the security code to the card controller, which in turn transmits 526 an acknowledgment, indicating a grant of access. To program the provisioning information, the computer must access 528 an order database. The record for the order being filled is accessed 530, and the provisioning information is transferred 532 to the computer. After being granted access by the card controller, the computer can then program 534 the provisioning information into the card. Furthermore, additional information, such as network parameters for the particular carrier whose service the present identity card will be used with may be programmed into the card at this time as well. Alternatively, the network parameters may have been pre-programmed by the card manufacturer.

Therefore the invention provides a method of provisioning an identity card for a mobile communication device for order fulfillment. The identity card includes a controller for controlling access to a memory of the identity card. The method commences by receiving an order for the mobile communication device at an order fulfillment center. The order includes provisioning information. The order fulfillment center then commences accessing a security identifier of the identity card, and retrieving from a database a security code corresponding to the security identifier of the identity card. Once the security code is obtained, the fulfillment center commences programming the provisioning information into the identity card using the security code.

The invention also provides a method of provisioning an identity card. The method commences by placing the identity card into a mobile communication device, and connecting the mobile communication device to a programming station via a connector of the mobile communication device. Once connected, the method commences by accessing a security identifier of the identity card, while the card is in the mobile communication device, and retrieving from a database a security code corresponding to the security identifier of the identity card. The method further commences by programming the provisioning information into the identity card using the security code.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of provisioning an unprogrammed identity card for a mobile communication device for order fulfillment, the unprogrammed identity card including a controller for controlling access to a memory of the unprogrammed identity card, comprising:
   at an order fulfillment center:
      receiving an order for the mobile communication device, the order including provisioning;
      accessing a security identifier of the unprogrammed identity card;
      retrieving from a database a security code corresponding to the security identifier of the unprogrammed identity card; and
      programming the provisioning information into the unprogrammed identity card using the security code.

2. A method of provisioning an unprogrammed identity card for a mobile communication device for order fulfillment as defined in claim 1, wherein receiving the order comprises receiving the order over an electronic data interchange network.

3. A method of provisioning an unprogrammed identity card for a mobile communication device for order fulfillment as defined in claim 1, wherein receiving the order includes receiving provisioning information including a registration identifier and an authentication key, and programming the provisioning information includes programming the registration identifier and authentication key into the unprogrammed identity card.

4. A method of provisioning an unprogrammed identity card for a mobile communication device for order fulfillment as defined in claim 1, wherein programming the provisioning information is performed while the unprogrammed identity card is in the mobile communication device.

5. A method of provisioning an unprogrammed identity card for a mobile communication device for order fulfillment as defined in claim 1, wherein the unprogrammed identity card, prior to programming the provisioning information, is partially programmed with specific network parameters for use with a particular communication network, and wherein the network parameters are programmed by the manufacturer of the unprogrammed identity card.

6. A method of provisioning an unprogrammed identity card for a mobile communication device for order fulfillment as defined in claim 1, further comprising programming the unprogrammed identity card with specific network parameters for use with a particular communication network.

7. A method of provisioning an unprogrammed identity card, comprising:
   placing the unprogrammed identity card into a mobile communication device;
   connecting the mobile communication device to a programming station via a connector of the mobile communication device;
   accessing a security identifier of the unprogrammed identity card;
   retrieving from a database a security code corresponding to the security identifier of the unprogrammed identity card; and
   programming provisioning information into the unprogrammed identity card using the security code.

8. A method of provisioning an unprogrammed identity card as defined in claim 7, wherein the unprogrammed identity card, prior to programming the provisioning information, is partially programmed with specific network parameters for use with a particular communication network.

9. A method of provisioning an unprogrammed identity card as defined in claim 7, further comprising programming the unprogrammed identity card with specific network parameters for use with a particular communication network.

* * * * *